Nov. 18, 1930.  P. L. ORR  1,781,930
ELECTRODE HOLDER
Filed Feb. 12, 1929
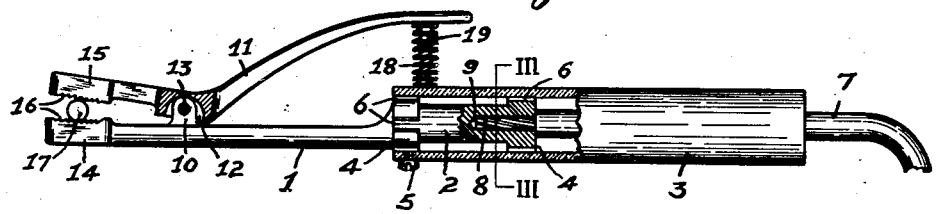
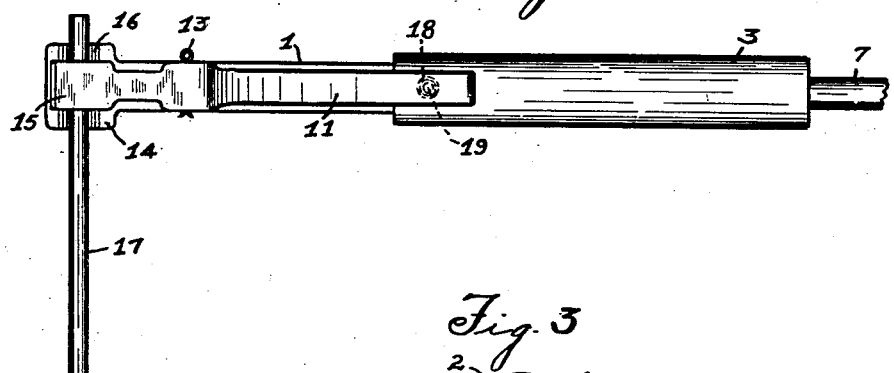
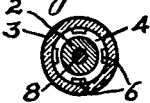
INVENTOR
Paul L. Orr
By Jack R Snyder
attorney.

Patented Nov. 18, 1930

1,781,930

UNITED STATES PATENT OFFICE

PAUL L. ORR, OF WILKINSBURG, PENNSYLVANIA

ELECTRODE HOLDER

Application filed February 12, 1929. Serial No. 339,324.

My invention relates to an electrode holder primarily designed for holding the electrode in electric welding operations, commonly termed arc welding, in which the parts to be joined are heated to fusion by an electric arc, in a manner well known in the art.

Important objects of the invention are to provide a holder of the character described which will securely hold an electrode, which will facilitate the manipulation of the latter when effecting arc welding operations, and which may be readily and conveniently operated to engage or release the electrode.

Further objects of the invention are to provide a device of the class stated which is simple in its construction and arrangement, strong, durable and efficient in its use, compact, positive in its action, and comparatively inexpensive to manufacture and maintain.

With the foregoing and other objects in view which will appear as the description proceeds, the invention resides in the combination and arrangement of parts and in the details of construction hereinafter described and claimed, it being understood, that changes in the precise embodiment of the invention herein disclosed can be made within the scope of what is claimed without departing from the spirit of the invention.

In the drawing wherein like numerals of reference designate corresponding parts throughout the several views:

Figure 1 is a side view of an electrode holder constructed in accordance with the invention.

Figure 2 is a top plan view thereof.

Figure 3 is a sectional view on line III—III, Figure 1.

Referring in detail to the drawing 1 represents a conductor bar constructed from any suitable metal providing an efficient electric current conductor. The rearward end of the conductor bar 1 is formed to provide a cylindrical connecting shank 2. The latter extends into a tubular handle 3, which is constructed from any suitable insulating material.

The connecting shank 2 is formed with a pair of circumferentially extending shoulders 4, which are disposed at respective ends thereof. The peripheries of the shoulders 4 engage the inner side of the tubular handle 3, while spacing the periphery of the main portion of the connecting shank 2 from the latter.

The handle 3 is detachably fixed in position by means of a screw 5, which extends through the wall of the handle 3 and is engaged in the forwardly disposed shoulder 4 of the connecting shank 2. It is, of course, evident that the handle 3 may be secured in position to the connecting shank 2 in any other suitable manner.

Each of the connecting shank shoulders 4 is provided with a plurality of transversely disposed grooves 6 constituting air vents. The grooves 6, in conjunction with the spaced position of the main portion of the connecting shank in the handle 3 in the manner stated, permit of the circulation of air through the handle 3, thereby minimizing the heating of the latter during the arc welding operations.

A suitably insulated, electrical current supply conductor 7 extends into the tubular handle 3, and has its terminal 8 fixed in an aperture 9 provided therefor in the rearward end of the connecting shank 2.

A bearing lug 10 is formed integral with the conductor bar 1. The former extends vertically and is disposed adjacent to the forward end of the latter.

A clamping lever 11, formed with a recess 12 for the reception of the bearing lug 10, is pivotally connected to the conductor bar 1, by means of any suitable pivoting element, preferably a cotter pin 13, which extends through the side walls of the recess 12 and through the bearing lug 10. The latter is completely housed in the recess 12, whereby potential damage to these pivotal connecting elements is appreciably reduced.

The forward end of the conductor bar 1 is formed to provide a clamping jaw 14, which is associated with a clamping jaw 15 formed at the forward end of the clamping lever 11. The opposed faces of the clamping jaws 14 and 15 are engrailed or roughed, as at 16, in any suitable manner to augment their gripping action on the electrode 17, which must be securely held therebetween during the arc welding operations.

The clamping jaw 14, of the conductor bar 1, is considerably enlarged for the purpose of providing a more rugged and durable structure, capable of withstanding the adverse conditions to which it is necessarily subjected during the arc welding operations.

The rearward end of the clamping lever 11 projects rearwardly over the forward end of the handle 3. A spring 18 is positioned between the top side of the forward end of the handle 3 and the under side of the rearward end of the clamping lever 11. The spring 18 is a spiral spring and is maintained in position by a depending teat 19, which latter is preferably formed integral with the under side of the clamping lever 11 and extends into the spring 18.

The normal action of the spring 18 forces the jaw 15, of the lever 11, into clamping engagement with the jaw 14, of the conductor bar 1, with sufficient tension to securely hold the electrode 17 in the associated jaws 14 and 15. To effect the release of the electrode 17 it is only necessary to depress the rearward end of the clamping lever 11 against the holding action of the spiral spring 18.

The present invention provides a most efficient device of its kind, which may be conveniently manipulated to effect arc welding operations, and which embodies a plurality of associated parts any of which may be readily replaced.

What I claim is:

In combination, an electrode holder comprising an electrical conductor bar provided with an enlarged clamping jaw at the forward end thereof, the rear end of said conductor being formed to provide a connecting shank having a pair of circumferentially extending shoulders disposed at respective ends of the latter, a tubular insulating handle detachably mounted on said pair of shoulders and spaced from said connecting shank, a lever provided with a clamping jaw at its forward end and having an enclosed pivotal connection with said conductor bar, a spiral spring seating on said insulating handle and engaging said lever for normally shifting and maintaining the clamping jaw of the latter in the clamping position with the clamping jaw of the said conductor bar, means formed in said conductor bar for connecting the latter with the source of electrical supply, said pair of shoulders being provided with a plurality of transversely extending grooves establishing air passages to said insulating handle, the opposed faces of said clamping jaws being flat and roughed to augment their gripping action.

In testimony whereof I affix my signature.

PAUL L. ORR.